UNITED STATES PATENT OFFICE.

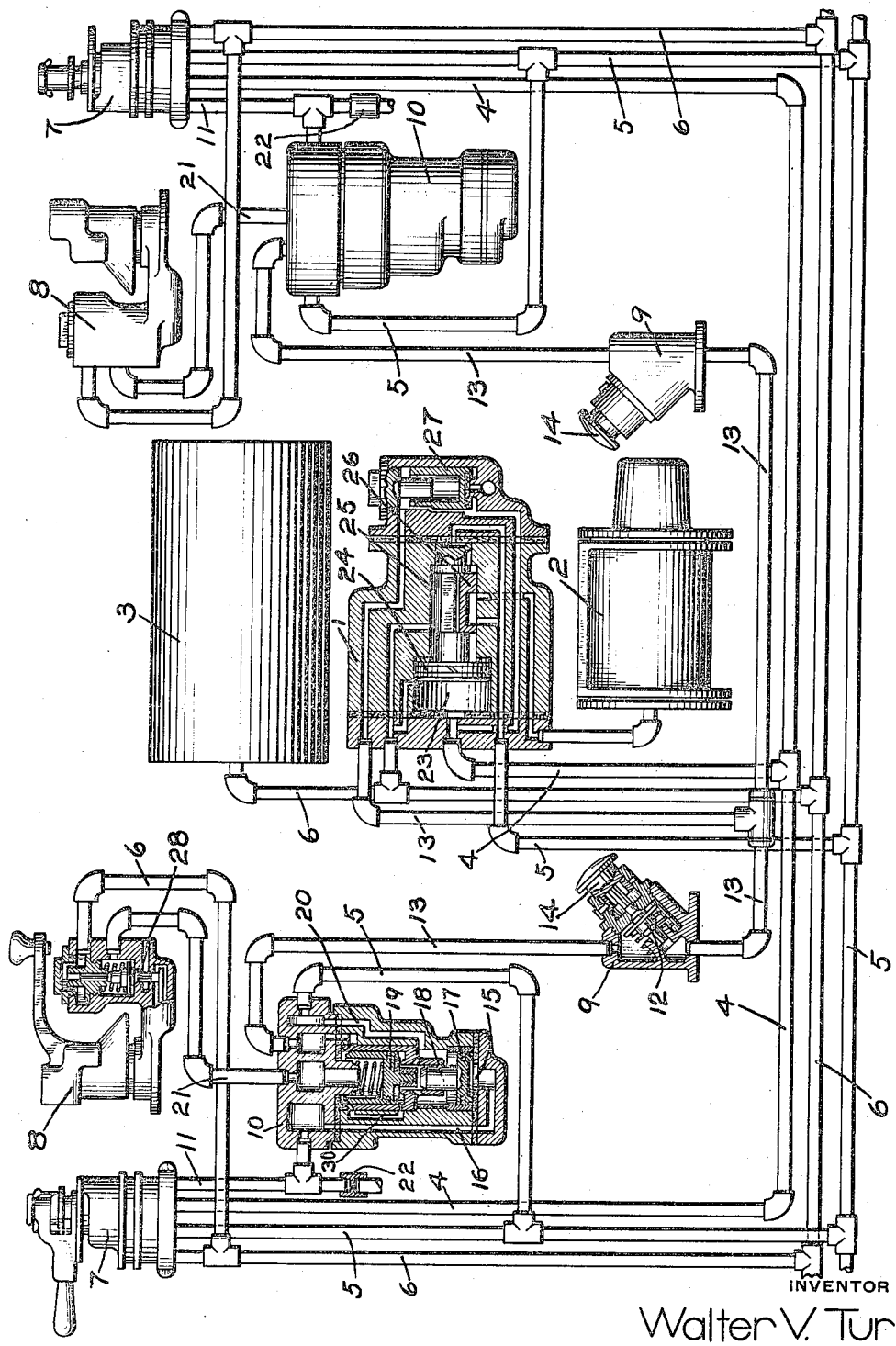

WALTER V. TURNER, OF WILKINSBURG, PENNSYLVANIA, ASSIGNOR TO THE WESTINGHOUSE AIR BRAKE COMPANY, OF WILMERDING, PENNSYLVANIA, A CORPORATION OF PENNSYLVANIA.

SAFETY CAR-CONTROL DEVICE.

1,317,530.　　　　　Specification of Letters Patent.　　Patented Sept. 30, 1919.

Application filed December 6, 1918. Serial No. 265,593.

*To all whom it may concern:*

Be it known that I, WALTER V. TURNER, a citizen of the United States, residing at Wilkinsburg, in the county of Allegheny and State of Pennsylvania, have invented new and useful Improvements in Safety Car-Control Devices, of which the following is a specification.

This invention relates to fluid pressure brakes, and more particularly to a safety car control equipment.

According to the construction shown in my prior Patent No. 1,265,006, dated May 7, 1918, a so-called cut-off valve is provided which is operated upon a predetermined increase in straight air pressure for cutting off communication through which fluid is vented from the brake pipe by operation of a pilot valve associated with the controller handle, when the hand is removed from the handle.

The object of employing the cut-off valve is to permit the operator to take his hand off the controller handle, if he so desires, provided he first makes a straight air application of the brakes, without thereby causing an emergency application of the brakes and the cutting off of power to the car motor.

It has been found that in some cases, leakage may occur through the leakage groove around the cut-off valve from the straight air pipe to and past the stem of the pilot valve to the atmosphere, even when the cut-off valve is seated by straight air pressure.

In a similar manner, leakage may occur from the pipe leading to the relay valve, past the pilot valve and its stem, when a straight air application of the brakes has been made, and the hand of the operator has been removed from the controller handle so as to open the pilot valve.

Furthermore, with this prior equipment, it is necessary for the operator to hold his hand on the controller handle, in order to prevent an emergency application of the brakes, until the straight air pressure has been raised to a predetermined degree sufficient to effect the operation of the cut-off valve, so that some delay and loss of time is occasioned.

The principal object of my invention is to provide means for overcoming the above difficulties.

In the accompanying drawing, the single figure is a diagrammatic view, partly in section, of a safety car control equipment, embodying my invention.

As shown in the drawing, the equipment may comprise an emergency valve device 1, a brake cylinder 2, a main reservoir 3, an emergency brake pipe 4, a straight air pipe 5, a main reservoir pipe 6, and in a double end equipment, at each end of the car, a brake valve 7, a safety controller handle device 8, a foot valve device 9, and a cut-off valve device 10.

The safety controller handle 8 is of the type in which the removal of the operator's hand from the controller handle operates to open a pilot valve 28 for venting fluid from a relay valve, which in turn is operated to vent fluid from the emergency brake pipe to effect an emergency application of the brakes.

The brake valve 7 controls the application and release of the brakes and also the car doors, a pipe 11 being connected to the brake valve for supplying fluid to the door engine (not shown) for opening the car doors.

The foot valve device 9 comprises a casing containing a double beat valve 12, normally permitting communication from the relay valve 27 in the emergency valve device, as shown in my prior Patent No. 1,265,006 hereinbefore referred to, through a pipe 13 and adapted, upon foot pressure being applied to the push button 14, to close said communication.

The cut-off valve device 10 may comprise a casing having a piston chamber 15, connected by passage 16 with door opening pipe 11 and containing a piston 17 provided with a stem 18.

A cut-off valve piston 19 is also contained in the casing and is adapted to be operated by engagement of the stem 18 therewith.

The valve piston 19 is subject on its inner seated area to pressure in the straight air pipe 5, as supplied through passage 20 and controls communication from pipe 13 to pipe 21 which leads to the pilot valve 28 of the safety controller handle device 8.

The emergency valve device 1 may comprise a casing, having a piston chamber 23, connected to emergency brake pipe 4 and containing piston 24 and having a valve chamber 25, connected to main reservoir 3, and containing slide valve 26.

A relay valve 27 is also contained in the casing and has one side connected to pipe 13 and the outer area of the outer side to the brake pipe 4.

In operation, fluid is supplied in the release position of the brake valve 7 at the operating end of the car to the emergency brake pipe 4 and from the main reservoir pipe 6, past the pilot valve of the device 8 to pipe 21 and thence, the valve piston 19 being seated, to pipe 13, leading to the relay valve in the emergency valve device 1, so long as the controller handle is held depressed by the operator.

If the controller handle is released, the pilot valve 28 operates to cut off the main reservoir pipe 6, and vent fluid from the pipe 21. The fluid in pipe 13 is therefore vented and the relay valve 27 in the emergency valve device is operated to vent fluid from the emergency brake pipe and thus effect an emergency application of the brakes.

If a straight air application of the brakes is made, fluid supplied to the straight air pipe 5 also flows through passage 20 to the seated area of valve piston 19, and when the straight air pressure has been increased to a predetermined degree, the valve piston 19 is operated to cut off communication through which fluid is vented from the relay valve 27 by operation of the pilot valve 28. The operator may then remove his hand from the controller handle without causing an emergency application of the brakes.

As so far described, the operation is substantially the same as that of the construction shown in my prior Patent No. 1,265,006.

According to my present invention, the operator may remove his hand from the controller handle without effecting an emergency application of the brakes upon movement of the brake valve handle to open the car doors, since fluid supplied to the door opening pipe 11 also flows through passage 16, of the cut-off valve device 10, to piston chamber 15 and acting on piston 17, operates the same so as to cause the stem 18 to engage the valve piston 19 and shift same to cut off communication from pipe 13 to pipe 21.

The port in the brake valve 7 for supplying fluid to the door opening pipe 11 is made large, so as to secure a rapid supply of fluid for quickly operating the piston 17, thus permitting the operator to promptly remove his hand from the controller handle without causing an emergency application of the brakes.

In order to compensate for the employment of a large door opening port in the brake valve, a choke plug 22 having a restricted port may be interposed in the door opening pipe beyond the point at which connection is made to the cut-off valve device.

The time when the operator is most likely to need the free use of his hands is when the car doors are opened and he wishes to make change for passengers and the like and so by utilizing fluid from the door opening pipe for operating the cut-off valve the operator has the use of his hands without loss of time when most desired.

Leakage past the stem of the pilot valve 28 from pipe 13 through pipe 21, when the handle of the controller is released and the pilot valve 28 is opened, is prevented if a straight air application of the brakes is first made, since communication from pipe 13 to pipe 21 is cut off by the seating of cut-off valve 19. Leakage from the straight air pipe 5 through the leakage groove 30 around valve piston 19 is also prevented by the seating of the valve piston.

Having now described my invention, what I claim as new, and desire to secure by Letters Patent is:—

1. In a safety car control equipment, the combination with a controller handle and a pilot valve operated upon release of the controller handle for venting fluid to effect an application of the brakes, of a pipe for supplying fluid to control the car doors and means operated by fluid supplied to said pipe for cutting off communication through which said pilot valve vents fluid.

2. In a safety car control equipment, the combination with a controller handle and a pilot valve operated upon release of the controller handle for venting fluid to effect an application of the brakes, of means for supplying fluid to open the car doors and a cut-off valve device operated by fluid supplied to open the car doors for cutting off communication through which the pilot valve vents fluid.

3. In a safety car control equipment, the combination with a controller handle and a pilot valve operated upon release of the controller handle for venting fluid to effect an application of the brakes, of means for controlling the car doors and a cut-off valve device operated upon opening the car doors for cutting off communication through which the pilot valve vents fluid.

4. In a safety car control equipment, the combination with a controller handle and a pilot valve operated upon release of the controller handle for venting fluid to effect an application of the brakes, of means for controlling the car doors, a valve for cutting off communication through which the pilot valve vents fluid, and a piston operated upon opening the car doors for actuating said valve.

5. In a safety car control equipment, the combination with a straight air pipe, a controller handle, and a pilot valve operated upon release of the controller handle for venting fluid to effect an application of the brakes, of a valve operated by straight air pressure for controlling communication through which said pilot valve vents fluid, means for supplying fluid to open the car doors, and means operated by fluid supplied to open the car doors for also operating said valve.

6. In a safety car control equipment, the combination with a brake pipe, a relay valve for venting fluid from the brake pipe, and a pilot valve for venting fluid from said relay valve for operating same, of a cut-off valve for controlling communication through which said pilot valve vents fluid and adapted to cut off communication from the relay valve to the pilot valve.

7. In a safety car control equipment, the combination with a straight air pipe, a controller handle, and a pilot valve operated upon release of the controller handle for venting fluid to effect an application of the brakes, of a cut-off valve operated by fluid from the straight air pipe for cutting off communication through which said pilot valve vents fluid and adapted to cut off communication from the straight air pipe to said pilot valve.

8. In a safety car control equipment, the combination with a straight air pipe, a controller handle, and a pilot valve operated upon release of the controller handle for venting fluid to effect an application of the brakes, of a cut-off valve operated by fluid from the straight air pipe for cutting off communication through which said pilot valve vents fluid and having a leakage groove through which fluid is supplied from the straight air pipe to the pilot valve, said cut-off valve being adapted to cut off communication through said leakage groove upon operation.

In testimony whereof I have hereunto set my hand.

WALTER V. TURNER.